United States Patent [19]

Wallace

[11] Patent Number: 4,493,583
[45] Date of Patent: Jan. 15, 1985

[54] LOCK-UP CORNER BRACKET FOR FRAME PARTS

[75] Inventor: Robert S. Wallace, Los Angeles, Calif.

[73] Assignee: M. Bosley Wright, Owings Mills, Md.

[21] Appl. No.: 535,784

[22] Filed: Sep. 26, 1983

[51] Int. Cl.³ .............................................. G09F 1/12
[52] U.S. Cl. ..................................... 403/402; 403/295
[58] Field of Search ............... 403/402, 294, 295, 401, 403/251, 298

[56] References Cited

U.S. PATENT DOCUMENTS

| | | | |
|---|---|---|---|
| 111,128 | 1/1871 | Linscott | 403/401 X |
| 497,915 | 5/1893 | Fulghum | 403/294 |
| 3,284,113 | 11/1966 | Howell | 403/298 X |
| 3,336,689 | 8/1967 | Miller | 403/294 X |

FOREIGN PATENT DOCUMENTS 153734   6/1932  Switzerland .................. 403/401

Primary Examiner—Andrew V. Kundrat
Attorney, Agent, or Firm—William W. Haefliger

[57] ABSTRACT

A lock-up corner bracket for frame parts is characterized by:
(a) the bracket having legs that extend in planes which define a corner angle,
(b) the legs having terminal enlargements that are elongated in parallel directions of forward insertion of the legs relatively into recesses formed in said parts, for retaining said parts in assembled relation.

9 Claims, 7 Drawing Figures

LOCK-UP CORNER BRACKET FOR FRAME PARTS

BACKGROUND OF THE INVENTION

This invention relates generally to corner brackets for holding frame parts in assembled conditions. More particularly, it concerns an improved bracket which is easily inserted into recesses in frame parts, which will lock to such parts, and which may be easily produced in molded plastic configuration.

There is a continuing need for simple, effective, low cost and easily inserted means to hold frame parts in corner assembled condition. The prior use of staples for this purpose is objectionable due to need for a staple gun and lack of staple strength sufficient to hold the frame parts together, against relative bending displacement.

SUMMARY OF THE INVENTION

It is a major object of the invention to provide a lock-up corner bracket which solves the above problems and difficulties, and which is particularly suitable for application and use with picture frame sections or parts. As will appear, the invention basically comprises:

(a) the bracket having legs that extend in planes which define a corner angle, (b) the legs having terminal enlargements that are elongated in parallel directions of forward insertion of the legs relatively into recesses formed in said parts, for retaining said parts in assembled relation.

More particularly, the enlargements are typically columnar, having ends which taper in the directions of relative insertion into the recesses to facilitate such insertions; the column-shaped enlargements have generally cylindrical outer surfaces to correspond to similar recess cylindrical surfaces which are easily drilled and resist splitting of the members or parts along grain directions; and the legs may have barbs thereon to engage recess walls and resist disassembly of the frame parts. As a result, the latter are rigidly held together against separation by the bracket after easy manual insertion of the bracket into the recesses in the frame parts, no special tools being needed to apply the bracket to the preformed frame parts.

These and other objects and advantages of the invention, as well as the details of an illustrative embodiment, will be more fully understood from the following description and drawings, in which:

DRAWING DESCRIPTION

DETAILED DESCRIPTION

Figure 1:
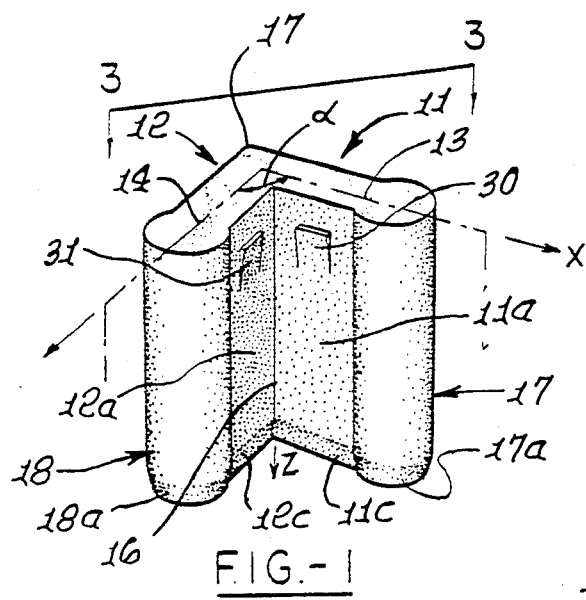
FIG. 1 is a perspective view of one side of a lock-up corner bracket incorporating the invention.
Figure 2:
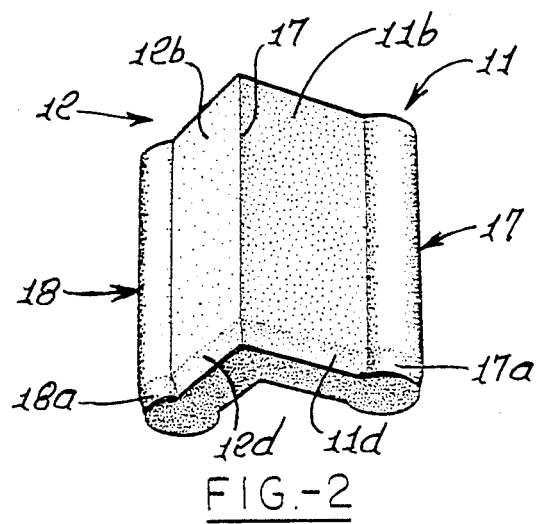
FIG. 2 is a perspective view of the opposite side of the FIG. 1 bracket.

In FIGS. 1 and 2 the illustrated lock-up corner bracket 10 is shown to include legs 11 and 12 that extend in planes 13 and 14 which define a corner angle $\beta$. The latter is typically about 90°, but may vary somewhat from 90°, as for example between 85° and 95°. The leg 11 has opposite sides 11a and 11b which are longitudinally elongated in the Z direction indicated by arrow Z, and leg 12 has opposite sides 12a and 12b which are also elongated in the Z direction. Plane 13 is an X-Z plane, and plane 14 is an X-Y plane. Note inside and outside corners 15 and 16 of leg intersections.

Figure 3:
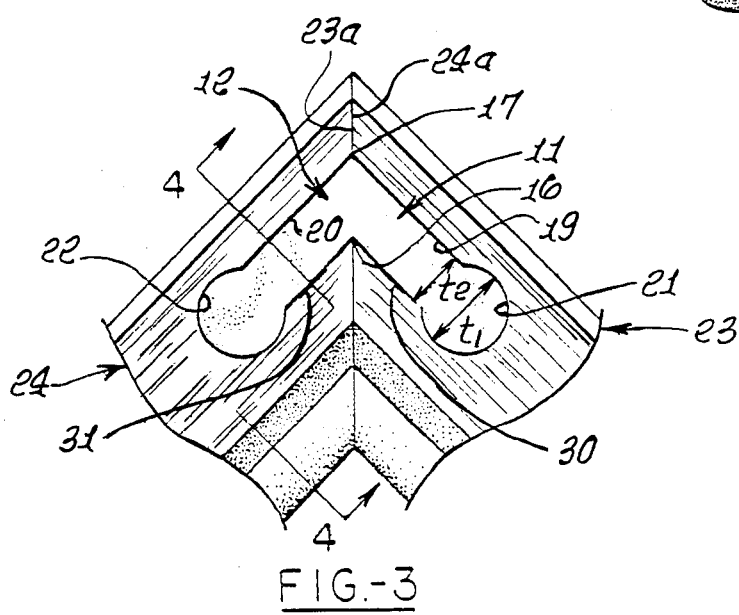
FIG. 3 is a plan view showing use of the FIG. 1 bracket in retaining frame parts in assembled conditions.

The legs have terminal enlargements that are also elongated in parallel directions (parallel to the Z-direction) of forward insertion of the legs relatively into recesses formed in the frame parts, for retaining such parts in assembled relation or conditions. In the example, the enlargements 17 and 18 are integral with legs 11 and 12, respectively, and are columnar, the planes 13 and 14 bisecting the enlargements. Note that the columnar enlargements have lengths approximately equal to the Z-direction lengths of the legs, and they have generally cylindrical outer surfaces throughout such lengths. Note also that the forwardmost end portions of the legs and enlargements are forwardly tapered (see tapers 11c and 11d, 12c, 12d, 17a and 18a) to assist in their initial slide receptions into the corresponding recesses (leg and column) indicated at 19–22 in frame parts 23 and 24. Such slide reception is close in all such recesses, whereby the frame parts are rigidly positioned, as assembled, with 45° angled surfaces 23a and 24a held in face-to-face, sturdy interengagement. This is enhanced due to the columnar enlargements having cross-sectional dimensions "$t_1$" exceeding the thickness dimension "$t_2$" of the legs, as indicated in FIG. 3.

Figure 5:
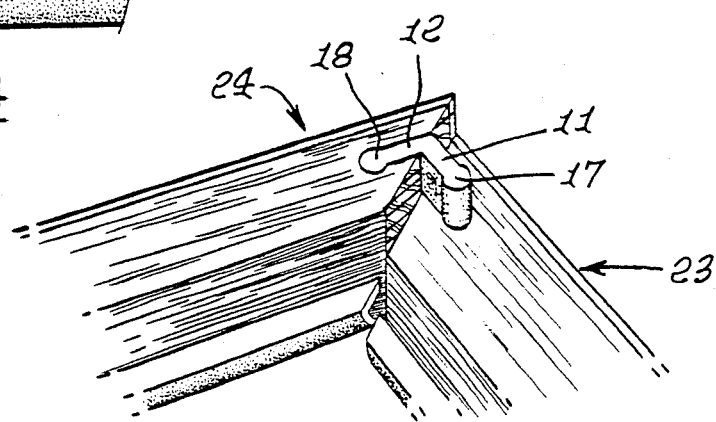
FIG. 5 is a perspective view showing partial assembly of frame parts and the bracket of FIG. 1.

FIG. 5 shows an easy assembly mode (made possible by the invention) wherein the leg 12 and column 18 are first inserted into the recesses 20 and 22 in part 24; and then the leg 11 and column 17 are relatively inserted into the recesses 19 and 21 in part 23 causing faces 23a and 24a to slide against one another until the assembly is completed with the tops of the legs and columns flush with the surfaces 23a and 24a of the frame parts 23 and 24. The latter frame parts may be those of a picture frame, with a bracket 10 easily assembled to the frame parts at each of the four corners of the picture frame. This enables the frame parts to be incorporated in a small kit suitable for mailing, so that the ultimate user can quickly assemble the frame using the improved corner brackets.

Figure 4:
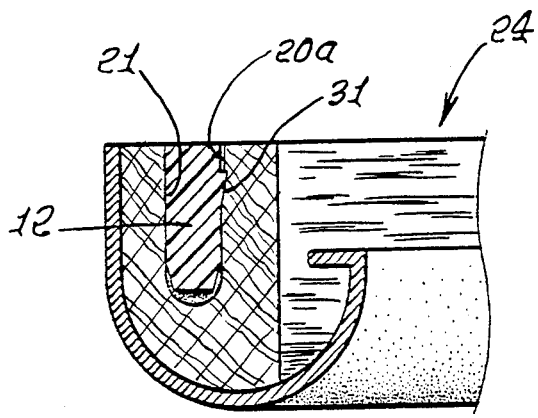
FIG. 4 is a section on lines 4—4 of FIG. 3.

An additional feature is the provision of a barb or barbs on one or both legs of the bracket. See for example barbs 30 and 31 on legs 11 and 12, in FIG. 1. Such barbs, integral with the bracket project outwardly from faces 11a and 12a, with forward taper, to compress the recess walls (see for example recess wall 20a in FIG. 4) during bracket insertion, and grip such walls to resist bracket removal from the recesses (i.e. to ensure that the parts 23 and 24 will remain assembled).

Figure 6:
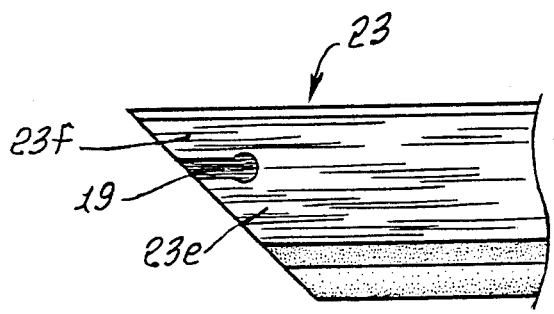
FIG. 6 is a top plan view of a frame part showing a recess cut thereby to receive one leg of the FIG. 1 bracket.
Figure 7:
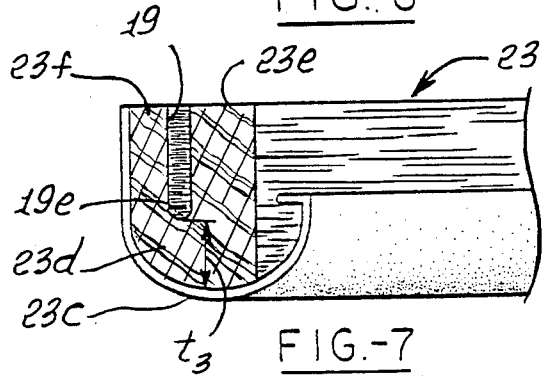
FIG. 7 is a side view of the frame part of FIG. 6.

FIGS. 6 and 7 show details of a recess 19 prior to bracket insertion therein. Note that the recess terminates at point 19e, at a considerable spacing "$t_3$" from the bottom 23c of the frame part, so that the structural strength of the latter is not undesirably reduced (i.e. region 23d of the frame part remains unslotted so that sections 23e and 23f are not undesirably spread apart during bracket insertion). Sections 23e and 23f each have substantially constant width along their length, for maximum strength, as enabled by the insertion.

The frame parts may consist of wood or plastic material, and the bracket may typically consist of plastic material, as for example molded polypropylene.

As is clear from FIG. 2, the forwardmost tapered portions of the legs 11 and 12 and the enlargements 17 and 18 terminate in a flat plane which is normal to the Z-direction of bracket insertion into the frame parts.

I claim:

1. A lock-up corner bracket for frame parts, comprising
   (a) the bracket having legs that extend in planes which define a corner angle,
   (b) the legs having terminal enlargements that are elongated in parallel directions of forward insertion of the legs relatively into recesses formed in said parts, for retaining said parts in assembled relation,
   (c) said enlargements being columnar,
   (d) the forwardmost end portions of said legs and columnar enlargements being forwardly tapered,
   (e) said tapered end portions of the legs and columnar enlargements terminating in a flat plane normal to said parallel directions.

2. The corner bracket of claim 1 wherein said columnar enlargements have lengths equal to leg length.

3. The corner bracket of claim 1 wherein said corner angle is about 90°.

4. The corner bracket of claim 1 wherein said enlargements have generally cylindrical outer surfaces.

5. The combination of claim 1 including multiple brackets as defined interconnecting picture frame parts at each corner of the picture frame.

6. The combination that includes the corner bracket of claim 1 and said frame parts, the bracket legs received into said recesses which are formed to closely slidably receive said legs including said enlargements.

7. The combination of claim 6 wherein said frame parts are picture frame lengths.

8. A lock-up corner bracket for frame parts, comprising
   (a) the bracket having legs that extend in planes which define a corner angle,
   (b) the legs having terminal enlargements that are elongated in parallel directions of forward insertion of the legs relatively into recesses formed in said parts, for retaining said parts in assembled relation,
   (c) said enlargements being columnar,
   (d) and including a barb on at least one leg and which projects relatively outwardly to engage one of said parts to resist relatively rearward removal of said bracket leg from said one part.

9. A lock-up corner bracket for frame parts, comprising
   (a) the bracket having legs that extend in planes which define a corner angle,
   (b) the legs having terminal enlargements that are elongated in parallel directions of forward insertion of the legs relatively into recesses formed in said parts, for retaining said parts in assembled relation,
   (c) said enlargements being columnar,
   (d) and including barbs on said legs and which project relatively outwardly to resist relatively rearward removal of said legs from said parts.

* * * * *